(12) United States Patent
Armstrong et al.

(10) Patent No.: US 8,107,826 B2
(45) Date of Patent: Jan. 31, 2012

(54) METHODS AND APPARATUS FOR OPTICAL TRANSMISSION OF DIGITAL SIGNALS

(75) Inventors: Jean Armstrong, North Balwyn (AU); Arthur James Lowery, Kew (AU)

(73) Assignee: Ofidium Pty Ltd., Melbourne (AU)

( * ) Notice: Subject to any disclaimer, the term of this patent is extended or adjusted under 35 U.S.C. 154(b) by 785 days.

(21) Appl. No.: 12/065,193

(22) PCT Filed: Sep. 1, 2006

(86) PCT No.: PCT/AU2006/001282
§ 371 (c)(1),
(2), (4) Date: Aug. 21, 2008

(87) PCT Pub. No.: WO2007/025346
PCT Pub. Date: Mar. 8, 2007

(65) Prior Publication Data
US 2009/0220239 A1 Sep. 3, 2009

(30) Foreign Application Priority Data

Sep. 2, 2005 (AU) .................................. 2005904833

(51) Int. Cl.
*H04B 10/12* (2006.01)
*H04J 14/00* (2006.01)
(52) U.S. Cl. ............ 398/193; 398/79; 398/81; 398/158; 398/159; 398/192; 398/194; 398/208
(58) Field of Classification Search .................... 398/79, 398/89, 99, 163, 182, 183, 185, 187, 208; 375/260, 316
See application file for complete search history.

(56) References Cited

U.S. PATENT DOCUMENTS

| | | | |
|---|---|---|---|
| 6,559,994 B1 * | 5/2003 | Chen et al. ..................... | 398/182 |
| 6,580,542 B1 | 6/2003 | Song et al. | |
| 2005/0074037 A1 * | 4/2005 | Rickard et al. ................. | 370/537 |
| 2005/0180760 A1 * | 8/2005 | Feced et al. .................... | 398/183 |

OTHER PUBLICATIONS

Panta et al: "Effects of Clipping on the Error Performance of OFDM in Frequency Selective Fading Channels", IEEE Trans. On Wireless Communications, vol. 3, No. 2, Mar. 2004.*
Carruthers et al : "Multiple-Subcarrier Modulation for Non-Directed Wireless Infrared Communication", IEEE J. Sel. Areas Commun., 14(3), Apr. 1996, pp. 538-546.*

* cited by examiner

*Primary Examiner* — Li Liu
(74) *Attorney, Agent, or Firm* — Woodcock Washburn LLP

(57) ABSTRACT

A method of communicating digital information over a dispersive optical channel includes encoding the digital information into a plurality of data blocks, each of which includes a number of bits of the information. A time-varying electrical signal is generated which corresponds with each of said data blocks. The time-varying electrical signal is applied to an optical transmitter (122) to generate an optical signal which includes an asymmetrically amplitude limited transmitted signal modulated onto an optical carrier. The optical signal is then transmitted over the dispersive optical channel (106). At a receiving apparatus (104) the optical signal is detected to produce an electrical signal which corresponds with the asymmetrically amplitude limited transmitted signal. A frequency domain equalization of the electrical signal mitigates the effect of dispersion of the optical channel (106) on the transmitted optical signal, and the equalized signal is decoded to recover the encoded data blocks and the corresponding transmitted digital information. The method enables bipolar signals to be transmitted over a dispersive unipolar optical channel, and reduces or eliminates the need to apply a high optical bias level at the transmitter, thereby improving optical power efficiency and enabling output power levels to be maintained below applicable safe levels, while simultaneously enabling the effects of channel dispersion to be substantially mitigated.

14 Claims, 6 Drawing Sheets

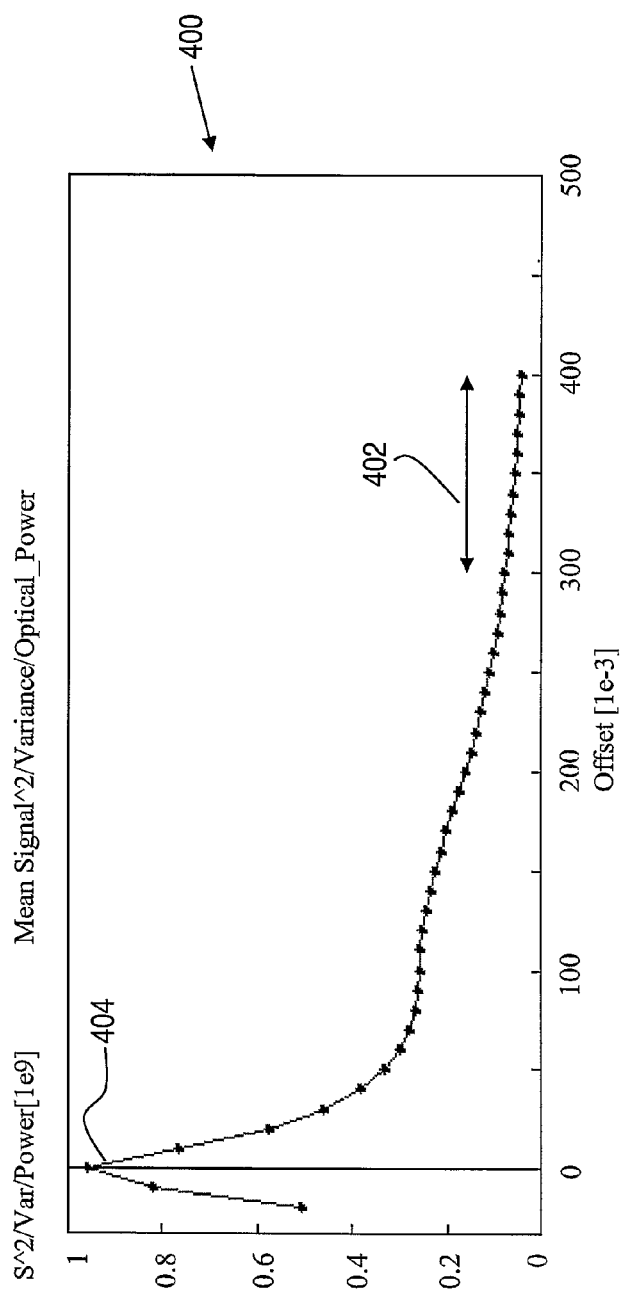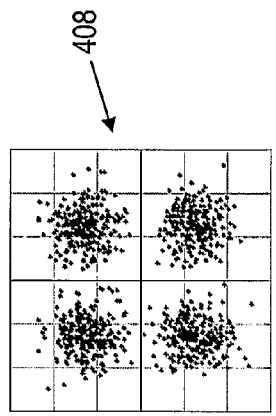
Figure 4A
Figure 4C
Figure 4B

METHODS AND APPARATUS FOR OPTICAL TRANSMISSION OF DIGITAL SIGNALS

CROSS REFERENCE TO RELATED APPLICATIONS

This application is the US national phase of PCT Application No. PCT/AU2006/001282, filed Sep. 1, 2006, which was based on Australian Application No. 2005904833, filed Sep. 2, 2005.

FIELD OF THE INVENTION

The present invention relates generally to optical communications, and more particularly to methods and apparatus, for modulation and transmission of digital signals, which are particularly advantageous in communications systems that include dispersive optical paths.

BACKGROUND OF THE INVENTION

Optical transmission, in which an information signal is modulated onto an optical carrier, is widely employed in modern communications systems. For example, long-haul transmission networks employ single-mode optical fibres for the transmission of digital information at very high bit rates, using one or more optical carriers, or wavelengths, over each fibre. Furthermore, optical transmission over shorter distances, and at lower bit rates, such as in customer access networks or local area data networks, are known which employ either single-mode or multi-mode optical fibres. Additionally, free space optical transmission paths may be used for line-of-sight communications and/or to provide a simple means of wireless interconnection of devices such as computers and peripherals, Personal Digital Assistants (PDAs), and other portable devices, typically using infrared light sources and detectors.

Accordingly, there is an ongoing interest in providing optical communications methods and devices that enable such communications to be conducted over greater transmission distances, and/or with greater reliability, efficiency and/or capacity.

However, optical transmission paths, whether over single-mode or multi-mode optical fibres, or through free space, may introduce distortion in the transmitted optical signals. Furthermore, the devices used for the transmission and reception of optical signals are possible additional sources of signal distortion. A common form of distortion is a frequency-dependent variation in the response of the communications channel, which may result in suppression of the amplitude of the signal (or fading) over particular frequency ranges and/or at specific frequencies, as well as variations in delay, or phase, of the received signal as a function of frequency. Such distortion may result from the frequency characteristics of the various electronic and optical devices used in the transmission system, as well as the characteristics of the optical transmission path itself.

In particular, the various types of optical path generally exhibit forms of dispersion, characterised by variations in the delay experienced by optical signals, or components thereof, transmitted over the optical path. Free space optical paths may exhibit multi-path effects, in which signals transmitted from an optical source reach a remote optical receiver via a number of different spatial paths, which may include a direct (line-of-sight) path as well as one or more paths including reflections off various surfaces in the surrounding environment. Accordingly, different components of the received optical signal experience different transmission delays, resulting in a time spread in the received optical signal which is one form of dispersion.

In multi-mode optical fibres, signals coupled into a fibre excite a large number of transverse optical modes supported by the fibre, each of which is characterised by a different group velocity. Accordingly, the components of the transmitted signal coupled into different transverse modes experience differing transmission delays along the multi-mode fibre, again resulting in dispersion of the received signal.

The dispersion resulting from multi-path propagation in free space optical transmission systems, and from modal dispersion within multi-mode fibres, may be either relatively static or time-varying, and can result in corresponding static or time-varying frequency fading in the received signal.

In single mode optical fibres, no multi-path or modal dispersion exists, however, in general, signals transmitted through single-mode fibres will experience various forms of degradation including chromatic dispersion, according to which different frequency components of the signal propagate at different speeds, and polarisation mode dispersion (PMD), according to which components of the signal coupled into different polarisation states propagate at different speeds. Both of these dispersion mechanisms, amongst others including various nonlinear processes, may result in spreading of transmitted pulses.

Additionally, all optical transmission channels will exhibit other forms of frequency-dependent distortion resulting from the characteristics of the transmitting and receiving electronic and opto-electronic components.

Methods for mitigating, or compensating, frequency-dependent distortion in communications channels are known, and have previously been extensively applied in radio frequency (RF) communications systems, including both wireless and wire-line systems. A particularly effective method for mitigating the detrimental effects of RF communications channels involves encoding information for transmission into discrete blocks of data which are then transmitted through the communications channel. At the receiver, each block is recovered, and an equalisation function performed, preferably in the frequency domain, in order to reduce, or eliminate, the frequency-dependent effects introduced in the channel. Many such methods employ some form of multi-carrier modulation, in which a serial data stream is converted into blocks consisting of several parallel data streams, which are then transmitted on separate frequency sub-carriers. At the receiving end, each of the parallel data streams is received, equalised according to the channel frequency response, and decoded to recover the original serial data stream provided to the transmitted.

Amongst the more popular forms of multi-carrier modulation methods is orthogonal frequency division multiplexing (OFDM). In OFDM systems, each sub-carrier is sinusoidal, and the particular set of sub-carriers is chosen such that all are orthogonal with one another over each transmitted symbol period. In a particularly convenient implementation, the required orthogonality is achieved through the use of orthogonal transforms in the transmitter and receiver respectively, and in the particular case of OFDM discrete Fourier transforms are used.

Modulation methods of the type described in the foregoing, including multi-carrier modulation schemes such as OFDM, offer several advantages over transmission using a single carrier modulated at a high modulation rate. These include the ability to operate over dispersive channels with complex time spreading, phase versus frequency and amplitude versus frequency characteristics. Accordingly, it would appear desirable to utilise such modulation methods over dispersive optical communications channels, such as free space channels, multi-mode fibres and single-mode fibres.

However, the use of such modulation schemes over optical channels has, to date, proven problematic. The aforementioned modulation methods, which have proven highly effective in RF communications systems, all involve the generation and transmission of bipolar signals, that is signals having both positive and negative excursions in amplitude. Bipolar signals are readily generated and transmitted in RF systems, in which the carriers are electromagnetic fields generated and detected as time-varying voltages and currents, which may take on arbitrary positive or negative values in accordance with the desired signal amplitude.

However, the simplest and most readily implemented form of optical modulation is Intensity Modulation (IM), in which the transmitted signal amplitude is represented by instantaneous optical power. This is inherently a unipolar modulation system, since negative values of power or intensity are not physically meaningful, and cannot be generated.

Past efforts to overcome the limitations inherent in unipolar intensity modulation have proven largely ineffective or impractical. One solution is to apply a relatively high bias level at the transmitter, such that the positive and negative excursions in transmitted signal amplitude are represented by variations around a fixed average optical output power of the transmitter. However, this is highly inefficient in its utilisation of the available optical transmission power, particularly in the case of multi-carrier modulation schemes which may generate signals having a very large peak-to-average power ratio, such that the peak excursions are much larger than the signal average value. While optical power inefficiency may be an issue in all types of optical transmission systems, an additional problem in free space systems is that the required optical output power may exceed eye-safe levels.

Other methods for encoding bipolar signals onto an optical channel include the use of more complex optical modulation schemes, such as multiple optical carriers with differential modulation, or the use of frequency, phase or polarisation modulation methods. However, all of these methods result in additional cost and complexity, while some require the use of coherent optical channels, and as such they are generally too expensive or otherwise impractical for many relevant applications. It would therefore be desirable, and is accordingly an object of the present invention, to provide methods and apparatus that employ suitable modulation and equalisation schemes for compensation of optical channel characteristics, and in particular the effects of various types of dispersion occurring in optical channels, while mitigating the aforementioned disadvantages of known optical modulation methods when applied to bipolar signals.

SUMMARY OF THE INVENTION

In one aspect, the present invention provides a method of operating an optical transmitter to transmit digital information over a dispersive optical channel, the method including the steps of:

encoding the digital information into a plurality of data blocks, each including a number of bits of the information;

generating a time-varying electrical signal corresponding with each of said data blocks; and applying the time-varying electrical signal to an optical transmitter to generate an optical signal including an asymmetrically amplitude-limited transmitted signal modulated onto an optical carrier, whereby the transmitted information may be recovered after transmission over the dispersive optical channel by use of a method that includes a frequency domain equalisation of the received signal.

Accordingly, the inventive method involves transmission of optical signals that may be asymmetrically amplitude limited and more particularly may be intensity-modulated signals that are amplitude limited at a zero optical output power level. The method thereby enables bipolar signals to be transmitted over a unipolar optical channel simply by allowing either the positive or negative amplitude excursions of the transmitted signals to be limited for transmission over the optical channel. This reduces or eliminates the need to apply a high optical bias level at the transmitter, thereby improving optical power efficiency and enabling output power levels to be maintained below applicable safe levels.

In another aspect, the invention provides a method of receiving digital information transmitted over a dispersive optical channel, wherein the digital information is encoded into a plurality of data blocks each including a number of bits of the information, and wherein time-varying signals corresponding with the data blocks are modulated onto an optical carrier to generate an optical signal including an asymmetrically amplitude-limited transmitted signal, the receiving method including:

detecting the optical signal to produce a received electrical signal corresponding with the asymmetrically amplitude-limited transmitted signal;

performing a frequency domain equalisation of the received electrical signal to mitigate the effect of the dispersion of the optical channel on the transmitted optical signal; and decoding the equalised signal to recover the encoded data blocks and the corresponding transmitted digital information.

In yet another aspect, the invention provides a method of communicating digital information over a dispersive optical channel, the method including the steps of:

encoding the digital information into a plurality of data blocks, each including a number of bits of the information;

generating a time-varying electrical signal corresponding with each of said data blocks;

applying the time-varying electrical signal to an optical transmitter to generate an optical signal including an asymmetrically amplitude-limited transmitted signal modulated onto an optical carrier;

transmitting the optical signal over the dispersive optical channel;

detecting the optical signal to produce a received electrical signal corresponding with the asymmetrically amplitude-limited transmitted signal;

performing a frequency domain equalisation of the received electrical signal to mitigate the effect of dispersion of the optical channel on the transmitted optical signal; and decoding the equalised signal to recover the encoded data blocks and the corresponding transmitted digital information.

The step of encoding preferably includes generating a plurality of symbol values corresponding with the information bits. Each said symbol value may encode one or more of the information bits, and accordingly the number of symbol values may be equal to or less than the number of information bits encoded within each data block.

The symbol values may be, for example, real or complex values generated in accordance with a desired mapping between the information bits and symbol values. Suitable mapping methods may correspond with conventional signal modulation formats, and may include, but are not limited to, On-Off Keying (OOK), Amplitude Shift Keying (ASK), Quadrature Amplitude Modulation (QAM), Phase Shift Keying (PSK), Frequency Shift Keying (FSK) and so forth.

In one preferred embodiment of the invention, the encoding and generating steps are performed in accordance with a multi-carrier method in the frequency domain, and in one advantageous implementation are performed in accordance with an OFDM method.

Accordingly, the step of generating a time varying electrical signal may include computing an Inverse Discrete Fourier Transform (IDFT) of the digital symbol values of each data block. Advantageously, the IDFT may be computed using a Fast Fourier Transform (FFT) algorithm. It will be appreciated by those skilled in the art that in other embodiments an alternative transformation into the time domain, based for example upon an alternative set of orthogonal basis functions and corresponding transform, may be used.

Preferably, the discrete digital values generated from the inverse transform are converted from parallel to serial format, and digital-to-analog conversion is used to generate a real, time-varying electrical signal.

The step of generating may also include the addition of a guard band or a cyclic prefix prior to the digital-to-analog conversion, which advantageously assists in the equalisation process at the receiver.

The generation of an asymmetrically amplitude-limited transmitted optical signal may be achieved using a number of different methods. For example, in one arrangement, a light-emitting diode (LED) or semiconductor laser diode is directly modulated using a reduced bias level that results in clipping of the transmitted signal at a zero optical output power level. A suitable bias level may be less than fifty percent of the peak-to-peak amplitude of the electrical signal, and in some embodiments it may even be possible to apply an effective negative bias, such that the positive excursions of the signal are somewhat suppressed, in addition to fully suppressing the negative excursions.

Alternative methods of generating an amplitude-limited transmitted optical signal include performing limiting, biasing and/or other amplitude adjustment in either the digital or analog (electrical) domain prior to modulation, in order to eliminate or reduce the reliance upon inherent limiting by the optical transmitter. For example, in addition to providing a bias adjustment, the electrical signal may be amplified, attenuated and/or inverted prior to modulation onto the optical carrier, and it should be noted that the application of inversion may result in the effective limiting of the amplitude of the positive, rather than negative, excursions of the transmitted signal. It may be particularly beneficial to perform such operations in the digital domain, prior to digital-to-analog conversion, in order to make most effective use of the conversion range and resolution of conversion hardware.

The present inventors have determined that it is particularly advantageous to apply a zero bias level, resulting in substantially complete suppression of the negative excursions of the signals, and in particular the inventors have shown that this arrangement is able to provide an improved optical power budget as compared with higher bias levels. In particular, it is possible to achieve significant improvement in power budget as compared with a conventional arrangement in which amplitude limiting is substantially avoided. Furthermore, in at least some circumstances an improvement in optical power budget may be achievable as compared with common serial transmission formats, such as OOK IM signals employing non-return-to-zero (NRZ) or return-to-zero (RZ) waveforms.

Other methods of modulating the optical carrier with an asymmetrically amplitude-limited transmitted signal may include the use of a continuous wave (CW) optical source, such as a laser or LED, in combination with a separate or integrated external modulator, such as a Mach-Zehnder or electro-absorption type modulator. As will be appreciated by those skilled in the art, numerous suitable methods of modulation of an optical carrier are available.

The step of transmitting the optical signal may include transmission through free space, through multi-mode optical fibre, or through single-mode optical fibre, or alternatively through any other suitable guided or unguided optical medium.

The step of detecting the optical signal preferably includes performing optical-to-electronic conversion, for example using a detector such as a photodiode, avalanche photodiode (APD), or the like, along with electrical amplification as required.

The step of performing a frequency domain equalisation of the electrical signal preferably includes sampling the signal to produce a sequence of discrete digital values. A transformation from the time domain, corresponding with the inverse transform performed when generating the time-varying electrical signal, may then be performed to generate a corresponding plurality of received symbol values. In one preferred embodiment, a Discrete Fourier Transform (DFT) of the sampled signal is performed, advantageously using an FFT algorithm, in order to compute the received symbol values. Equalisation then preferably includes performing an amplitude and/or phase adjustment of each received symbol value in order to substantially equalise the effect of the dispersion of the optical channel on the transmitted optical signal, such that the received and equalised symbol values more closely approximate the transmitted symbol values.

The step of decoding the equalised signal preferably includes recovering the original information bits from the equalised received symbol values. It is particularly preferred that a demapping method is used to recover the original information bits that corresponds with the mapping applied in the encoding step. As previously described, suitable mapping and demapping methods correspond with convention signal modulation formats, including OOK, ASK, QAM, PSK, FSK and so forth.

In another aspect, the invention provides an apparatus for transmitting digital information over a dispersive optical channel, the apparatus including:

an encoder for encoding the digital information into a plurality of data blocks, each including a number of bits of the information;

a signal generator for generating a time-varying electrical signal corresponding with each of said data blocks; and an optical transmitter including means for modulating an optical carrier with the time-varying electrical signal to generate an optical signal including an asymmetrically amplitude-limited transmitted signal modulated onto the optical carrier, whereby the transmitted information may be recovered after transmission over the dispersive optical channel by a corresponding receiver including means for performing a frequency domain equalisation of the received signal.

In a preferred embodiment, the encoder includes a plurality of mapping units for receiving the information bits and generating a corresponding plurality of symbol values. The mapping units may implement any one or more of a number of appropriate mapping methods, including mappings corresponding with conventional modulation formats such as OOK, ASK, QAM, PSK, FSK and so forth. In preferred embodiments the mapping units may be implemented using digital hardware and/or software means, as well-known in the art of digital signal processing.

The signal generator may include digital hardware and/or software means for implementing an inverse transform to produce a digital time domain signal. In a particularly preferred embodiment, the signal generator includes means for computing an IDFT, preferably using an FFT algorithm. The signal generator may further include a parallel to serial converter for generating a time sequence of digital samples from the output of the transform generator, and a digital-to-analog converter (DAC) for generating a continuously time varying electrical signal. In preferred embodiments, the signal generator is configured to insert a guard time and/or a cyclic prefix into the time varying signal, to assist in the equalisation of the received signal in the frequency domain at the corresponding receiver.

The optical transmitter preferably includes an optical source, such as an LED, semiconductor laser or other source of optical radiation. The optical transmitter may further include electrical driving circuitry for directly modulating the optical source, and alternatively or additionally may include an external optical modulator, such as a Mach-Zehnder or electro-absorption type modulator or the like.

In still another aspect, the invention provides an apparatus for receiving digital information transmitted over a dispersive optical channel, wherein the digital information is encoded into a plurality of data blocks each including a number of bits of the information, and wherein time-varying signals corresponding with the data blocks are modulated onto an optical carrier to generate an optical signal including an asymmetrically amplitude-limited transmitted signal, the receiving apparatus including:

an optical detector for detecting the optical signal to produce a received electrical signal corresponding with the asymmetrically amplitude-limited transmitted signal;

means for performing a frequency domain equalisation of the received electrical signal to mitigate the effect of dispersion of the optical channel on the transmitted optical signal; and a decoder for decoding the equalised signal to recover the encoded data bits and the corresponding transmitted digital information.

In preferred embodiments, the optical detector includes a suitable device for optical to electronic conversion of the optical signal, such as a photodiode, avalanche photodiode (APD) or the like. The optical detector may further include electronic devices, such as amplifiers, filters and so forth, for adjusting the signal level and conditioning the received signal.

The frequency domain equalisation means preferably includes an analog-to-digital converter (ADC) for sampling the detected signal and generating a digitised time sequence representative of the signal.

The frequency domain equalisation means preferably further includes digital hardware and/or software means for performing a serial to parallel conversion of the sampled data. Additionally, in preferred embodiments the frequency domain equalisation means includes hardware and/or software means for computing a transformation of the digitised signal into the frequency domain, more preferably being means for performing a DFT, for example using an FFT algorithm. According to preferred embodiments, the output of said transform is a plurality of received symbol values.

The frequency domain equalisation means preferably further includes an equaliser bank including a plurality of filters for adjusting the amplitude and/or phase of each received symbol value in order to substantially equalise the effects of the dispersive optical channel on the transmitted signal.

According to preferred embodiments of the invention, the decoder includes a plurality of demapping units for receiving the equalised symbol values, and generating corresponding bits of the digital information. As will be appreciated, the demapping units may correspond with mapping units employed in a corresponding transmitter, and accordingly may implement any appropriate demapping method, such as demapping corresponding with conventional modulation formats including OOK, ASK, QAM, PSK, FSK and so forth. In preferred embodiments the demapping units may be implemented using digital hardware and/or software means, as well-known in the art of digital signal processing.

In further aspects, there are also provided systems including one or more transmitting apparatus according to the invention in communication over one or more dispersive optical channels with one or more receiving apparatus also according to the invention.

Further preferred features and advantages of the invention will be apparent to those skilled in the art from the following description of preferred embodiments of the invention, which should not be considered to be limiting of the scope of the invention as defined in the preceding statements, or in the claims appended hereto.

BRIEF DESCRIPTION OF THE DRAWINGS

Preferred embodiments of the invention are described with reference to the accompanying drawings, in which:

FIG. 4A is a graph illustrating transmission performance as a function of an optical bias level according to an embodiment of the invention;

FIGS. 4B and 4C show example constellation patterns corresponding with two different optical bias levels illustrated in FIG. 4A;

DETAILED DESCRIPTION OF PREFERRED EMBODIMENTS

Figure 1:
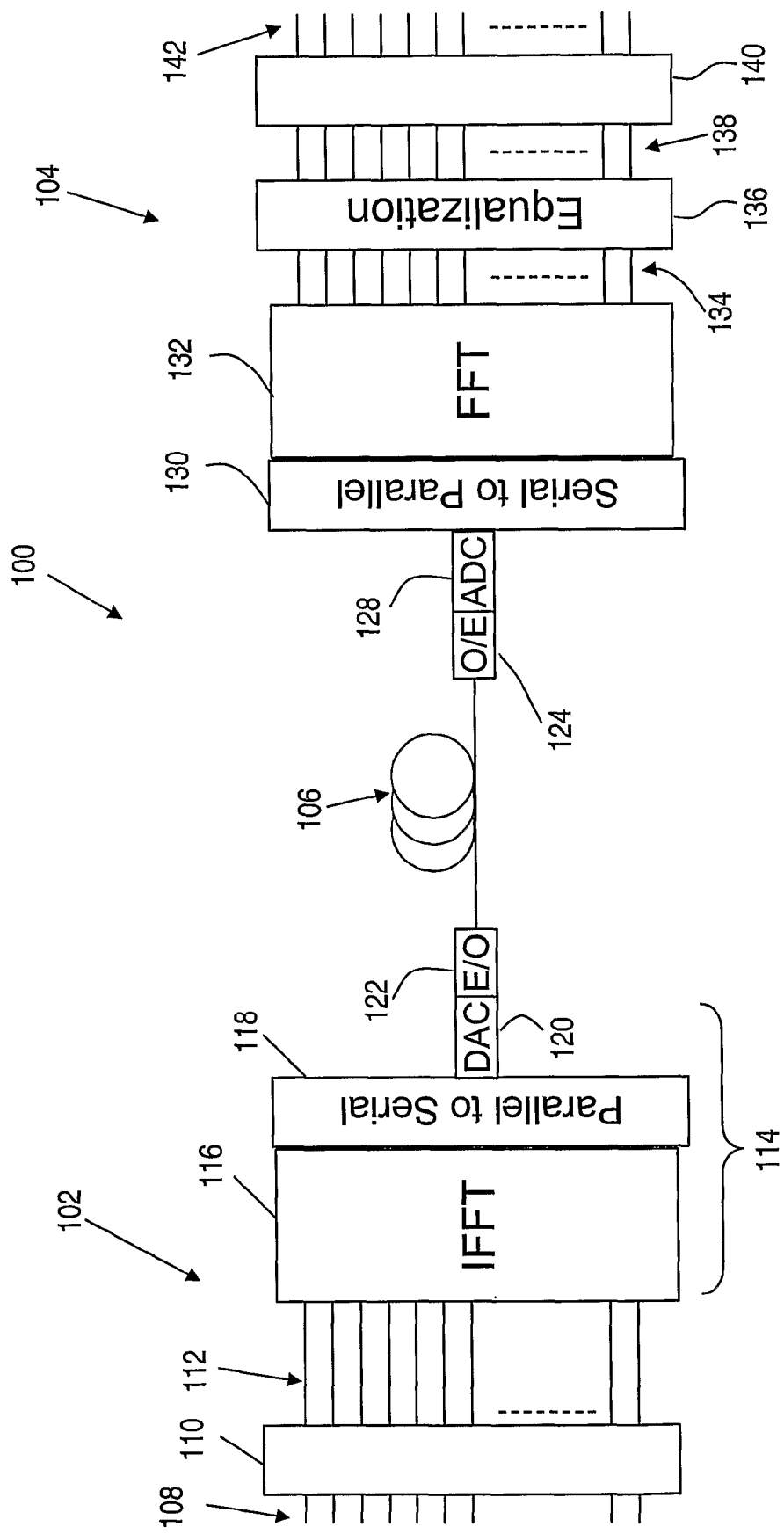
FIG. 1 illustrates schematically a system for communicating digital information over an optical channel according to an embodiment of the invention.

Turning first to FIG. 1, there is shown schematically a system for communicating digital information over an optical channel according to a preferred embodiment of the present invention. While the invention is exemplified herein by the system 100, which employs orthogonal frequency division multiplexing (OFDM) in encoding and modulating signals for transmission over an optical channel, it is to be understood that the invention is not limited to this particular embodiment. Rather, embodiments of the invention are characterised generally by coding of digital information in blocks, the optional addition of a guard time or cyclic prefix at the transmitter, and equalisation of the received signal in the frequency domain after transmission over the optical channel. While OFDM provides one advantageous means for implementing these functions, the description of preferred embodiments by reference to an OFDM implementation will be understood to be exemplary only, and not limiting of the invention as more broadly defined in the preceding summary and the claims appended hereto.

The exemplary system 100 includes transmission apparatus 102 and receiving apparatus 104, which for convenience are more generally referred to herein as the "transmitter" and the "receiver" respectively.

The transmitter 102 communicates with the receiver 104 via dispersive optical channel 106. While in FIG. 1 the optical channel 106 is schematically represented as a coiled optical fibre, such as a multimode fibre, it will be understood that the optical channel 106 may include a single-mode or multimode optical fibre, a free space link, or any other suitable guided or unguided optical medium.

The transmitter 102 includes mapping units 110, signal generator 114 and optical transmitter 122, the details and operation of which are described in greater detail below. The receiver 104 includes optical detector 124, a frequency domain equaliser including signal decoding components 128, 130, 132 and equaliser bank 136, and demapping units 140. Again, details of the receiver 104 and its operation are provided below.

Digital information for transmission over the optical channel 106 is input to the transmitter 102 via the parallel input port 108. The input digital information is received in blocks, each block including a number of bits of information corresponding with the number of parallel inputs in input port 108. It will be appreciated that other forms of input for digital information, such as a serial input port, may alternatively be provided. The number of bits of information included in each block is typically predetermined, and in any particular embodiment may be a fixed number of bits, or may change over time. For example, the number of bits per block may be dynamically predetermined in accordance with various factors such as measured channel quality, desired information bit rate, and/or other system parameters.

Each block consisting of a number of input bits is encoded to produce a plurality of symbol values, which in the exemplary transmitter 102 are communicated along parallel signal paths 112. According to the preferred embodiment of the system 100 a QAM mapping is used by the mapping units 110 to encode the input data bits in order to provide the resulting encoded symbol values. Each QAM signal value is a complex number representing the amplitude and phase modulation to be applied to a corresponding frequency carrier of the transmitted signal. It will be appreciated, however, that alternative mapping schemes may be used for encoding of the input data, including, but not limited to, OOK, ASK, PSK, FSK and so forth.

The signal generator 114 in the transmitter 102 converts the symbol values of each data block provided on parallel signal lines 112 into a corresponding continuously time-varying electrical signal. According to the exemplary embodiment of the system 100, and in accordance with OFDM methods, the signal generator 114 includes a frequency-to-time transformation 116, a parallel-to-serial converter 118, and a digital-to-analog converter (DAC) 120. The frequency-to-time transformation 116 is implemented using an inverse discrete Fourier transform (IDFT), which may be readily provided using either digital electronic hardware or software means, or a combination of hardware and software, as well known in the art.

In the exemplary embodiment 100, the IDFT 116 produces a parallel data output, which is converted to a sequence of digitised samples of the required time-varying electrical signal waveform by parallel-to-serial converter 118. The DAC 120 is then used to generate the continuously time-varying electrical signal.

The time-varying electrical signal is converted into an optical form by electrical-to-optical (E/O) converter 122. The E/O converter 122 is an optical transmitter which is used to generate an optical signal including an asymmetrically amplitude-limited transmitted signal which is modulated onto an optical carrier. In particular, the optical signal output from optical transmitter 122 is an intensity-modulated signal produced by suitable modulation of the optical transmitter 122 with the time-varying electrical signal output from DAC 120.

It will be understood that the output of the IDFT 116 is generally complex valued, while a real-valued waveform is required to modulate the optical transmitter 122. Various methods are well-known in the art for providing the required real-valued signal, and in the exemplary embodiment 100 an upconversion method is used, in which the real and imaginary components of the complex values are modulated in quadrature onto RF subcarriers in the electrical domain. The required operations may be performed, for example, either digitally (i.e. prior to DAC 120) or using two DAC's 120, for the real and imaginary components respectively, followed by suitable analog electronics. As the required components and operations will be apparent to those skilled in the art, they are omitted in the schematic diagram of FIG. 1.

Figure 2:
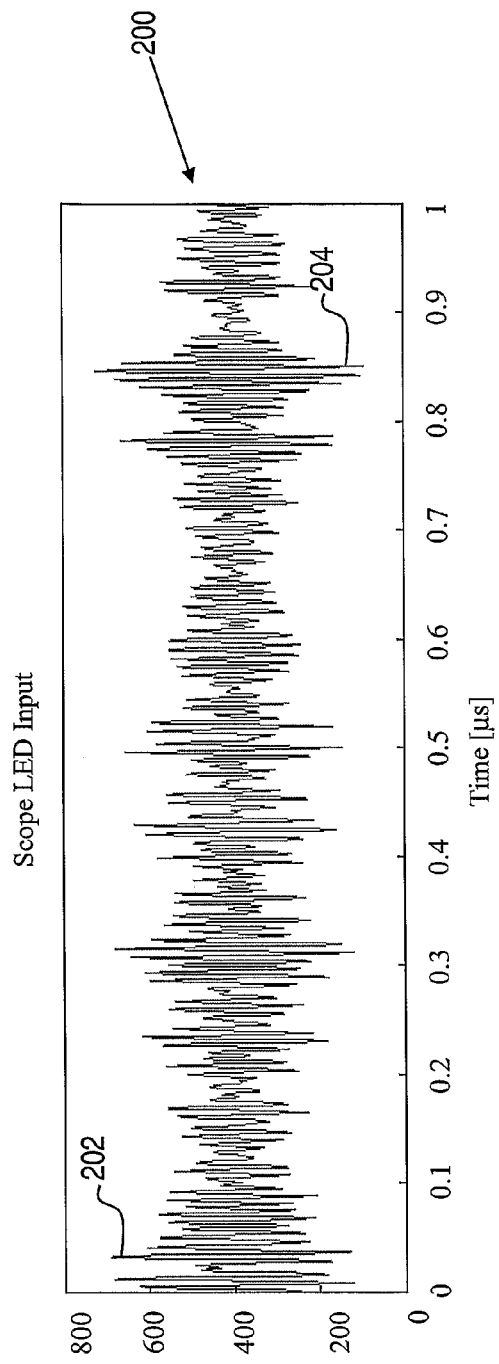
FIG. 2 shows a bipolar OFDM waveform generated within the transmitter of the system shown in FIG. 1.
Figure 3:
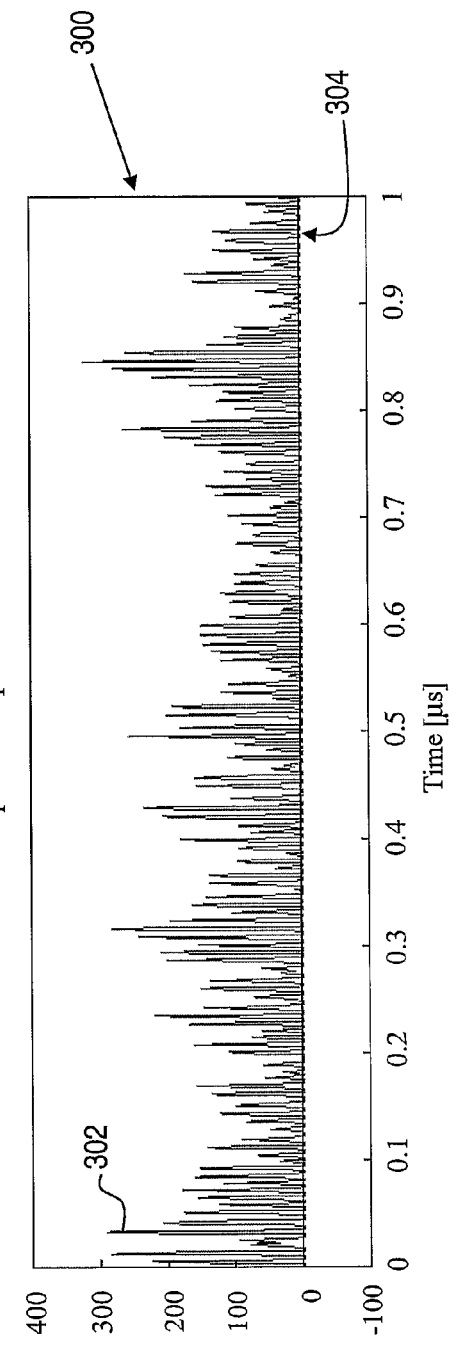
FIG. 3 illustrates a unipolar OFDM waveform transmitted over the optical channel of FIG. 1.

The application of the time-varying electrical signal to the optical transmitter 122 in order to generate an optical signal including an asymmetrically amplitude-limited transmitted signal modulated onto an optical carrier is illustrated by the waveforms shown in FIGS. 2 and 3. FIG. 2 illustrates an exemplary OFDM waveform 200 generated at the output of DAC 120. It is apparent that the OFDM waveform 200 is a bipolar waveform, which includes positive amplitude excursions, e.g. 202, and negative amplitude excursions, e.g. 204. It has previously been generally believed that bipolar signals such as waveform 200 present particular difficulties for optical transmission systems using intensity modulation with direct detection (IM/DD). In particular, since the output power, or intensity, of an optical transmitter must always be either zero or positive, it is not possible to directly transmit a bipolar waveform having a zero mean value, such as waveform 200, over an IM/DD optical channel. A common approach has therefore been to apply a bias level to an optical transmitter in order to offset the mean output power so as to accommodate the negative signal excursions, e.g. 204. This approach is, however, wasteful of the optical power budget, and may require relatively high optical output power levels, thereby creating potential safety issues, particularly over free space optical links.

In accordance with the present invention, therefore, a significantly lower, or even a zero, bias level is applied within the optical transmitter 122, resulting in an optical output signal that is asymmetrically amplitude-limited due to clipping of negative excursions, e.g. 204, at the zero output power level. FIG. 3 shows an exemplary optical output power waveform 300 generated in accordance with the invention, wherein no optical bias has been applied in the transmitter 122. The waveform 300 includes positive power excursions, e.g. 302, however negative excursions are substantially suppressed at the zero output power level 304.

A variety of different arrangements may be employed within optical transmitter 122 in order to generate the output optical waveform 300 from a bipolar time-varying electrical signal such as that represented by OFDM waveform 200. For example, an LED or semiconductor laser may be directly modulated at a zero bias level, or using a reduced bias level that is less than 50% of the peak-to-peak amplitude of the electrical signal 200. Indeed, in some embodiments, an effective negative bias may even be applied. The required biasing and/or limiting of the transmitted may be performed by the optical source and associated driving circuitry, or may be applied in either the digital or analog (electrical) domain prior to modulation of an optical source, such as an LED or semiconductor laser. Such digital or analog limiting may be appropriate, for example, if direct application of a bipolar waveform, e.g. 200, to the optical source may result in damage and/or undesirable effects such as turn-on delay, as a result of large negative excursions, e.g. 204, in the waveform. Indeed, to avoid so-called "memory effects", such as turn-on delay, in a directly-modulated optical source, it may be desirable, and is within the scope of the invention, to provide pre-modulation limiting of negative signal excursions in combination with a positive bias sufficient to avoid turn-off and/or saturation of the optical source.

It may be particularly advantageous to perform some or all such signal processing in the digital domain, prior to digital-to-analog conversion, in order to make the most effective use of the conversion range and resolution of DAC 120.

Output optical waveform 300 may alternatively be generated by the use of appropriate digital and/or analog limiting, biasing or other amplitude adjustment in combination with external modulation of an optical source, for example using a Mach-Zehnder or electro-absorption type modulator. All such methods for the generation of the optical output waveform 300 as would be apparent to persons skilled in the art will be understood to fall within the scope of the invention.

Returning now to FIG. 1, the asymmetrically amplitude-limited optical signal is transmitted over optical channel 106, and received at the receiver 104 using the optical to electrical (O/E) converter 124. The O/E converter 124 is an optical detector typically including a suitable photodiode or equivalent, as well as associated electronic circuitry, such as amplifiers, filters and the like, for generating a received electrical signal having suitable characteristics for further processing within the receiver 104.

In accordance with the exemplary embodiment of the receiver 104, the resulting received electrical signal, which corresponds with the asymmetrically amplitude-limited transmitted optical signal, is converted into a corresponding sequence of digitised samples using analog-to-digital converter (ADC) 128. The serial sequence of digital samples is converted into parallel form in serial-to-parallel converter 130, and the parallel block of samples is converted by the discrete Fourier transformer (DFT) 132 into a corresponding set of frequency domain values output along parallel signal paths 134. It will be noted that in the exemplary embodiment of system 100 the DFT 132, which is preferably implemented using an FFT algorithm, is the inverse transform corresponding with IFFT 116 carried out within transmitter 102.

The frequency domain values output from DFT 132 include a set of modulated symbol values corresponding with the transmitted symbol values input to IFFT 116 within the transmitter 102. However, the received symbol values have been affected by transmission over the dispersive optical channel 106, such that errors may occur in the recovery of the original transmitted digital information. In order to compensate for the effects of the optical channel 106 on the modulated symbol values, equalisation is applied using equaliser bank 136. In the exemplary embodiment of the receiver 104 the equaliser bank includes a plurality of filters. In the simplest case, each filter is a complex multiplier which adjusts the amplitude and/or phase of a corresponding received symbol value output from DFT 132 in order to substantially equalise the effects of the dispersive optical channel 106 on the transmitted signal. It will be appreciated that such equalisation may additionally compensate for non-ideal frequency-dependent characteristics of the various electronic and opto-electronic components of the transmitter 102 and receiver 104.

The resulting equalised symbol values are output along parallel signal lines 138 to demapping units 140, which correspond with mapping units 110. The demapping units 140 receive the equalised symbol values and generate corresponding bits of the digital information. The resulting decoded information is output along parallel signal lines 142, and if the levels of noise and/or distortion within the system 100 are not excessively high then the output digital information bits on signal lines 142 will generally match the original digital information bits input at signal lines 108. It will, of course, be appreciated by those skilled in the art that errors may be introduced due to noise and/or distortion in any communications system, and accordingly that a zero error rate in the transmitted information bits may not be achievable. However, it will also be understood that additional means may be employed, including error detection and error correction codes inserted within the digital information, in order to detect and/or correct such bit errors.

It will be appreciated from the foregoing discussion that ADC 128, serial-to-parallel converter 130, DFT 132 and equaliser bank 136 in combination provide means for performing a frequency domain equalisation of the received signal in order to mitigate the effect of the dispersion of the optical channel 106 on the transmitted optical signal. Furthermore, the function of demapping units 140 is to decode the equalised signal in order to recover the encoded transmitted data blocks and the corresponding transmitted digital information. While OFDM techniques, including the use of discrete Fourier transforms, are employed to provide these functions within the exemplary embodiment 100 of the present invention, it will be appreciated that in alternative embodiments other means for providing frequency domain equalisation and for decoding the equalised signal may be provided.

FIG. 4A shows a graph 400 illustrating a measure of the system transmission performance as a function of the optical bias level applied in the optical transmitter 122. The particular measure of performance illustrated in FIG. 4 is the ratio of the mean-signal-level-squared to the signal variance (i.e. a measure of the ease of distinguishing specific transmitted signal values) divided by the average optical power. According to conventional methods, a relatively high optical bias level within the range 402 would be applied, in order to avoid clipping or limiting of the negative excursions of the transmitted signal. Since this conventional method requires the transmission of higher levels of optical power without any corresponding increase in the information transmission, it corresponds with a relatively low performance according to the measure illustrated in the graph 400. By contrast, when a zero bias 404 is applied in transmitter 122 the average transmitted optical power is significantly reduced, such that an overall increase in the performance according to this measure is provided, despite the effect of asymmetrical amplitude-limiting on the transmitted signal.

Equivalently, for given transmitted optical power and total optical link loss, the received signal quality corresponding with bias level 404 will be superior to that corresponding with a conventional bias level in the range 402. This is illustrated in FIGS. 4B and 4C which show exemplary constellation patterns for received symbols mapped according to a 4-QAM scheme after transmission using the same average source power over an optical link having a loss of 30 dB. The constellation 406 corresponds with zero bias level 404, while the constellation 408 corresponds with a bias level within the range 402. It is apparent that the quality of the received symbols represented by constellation 406 is superior to that of the received symbols represented by constellation 408, due to the relatively greater effect of receiver noise on the latter.

Figure 5:
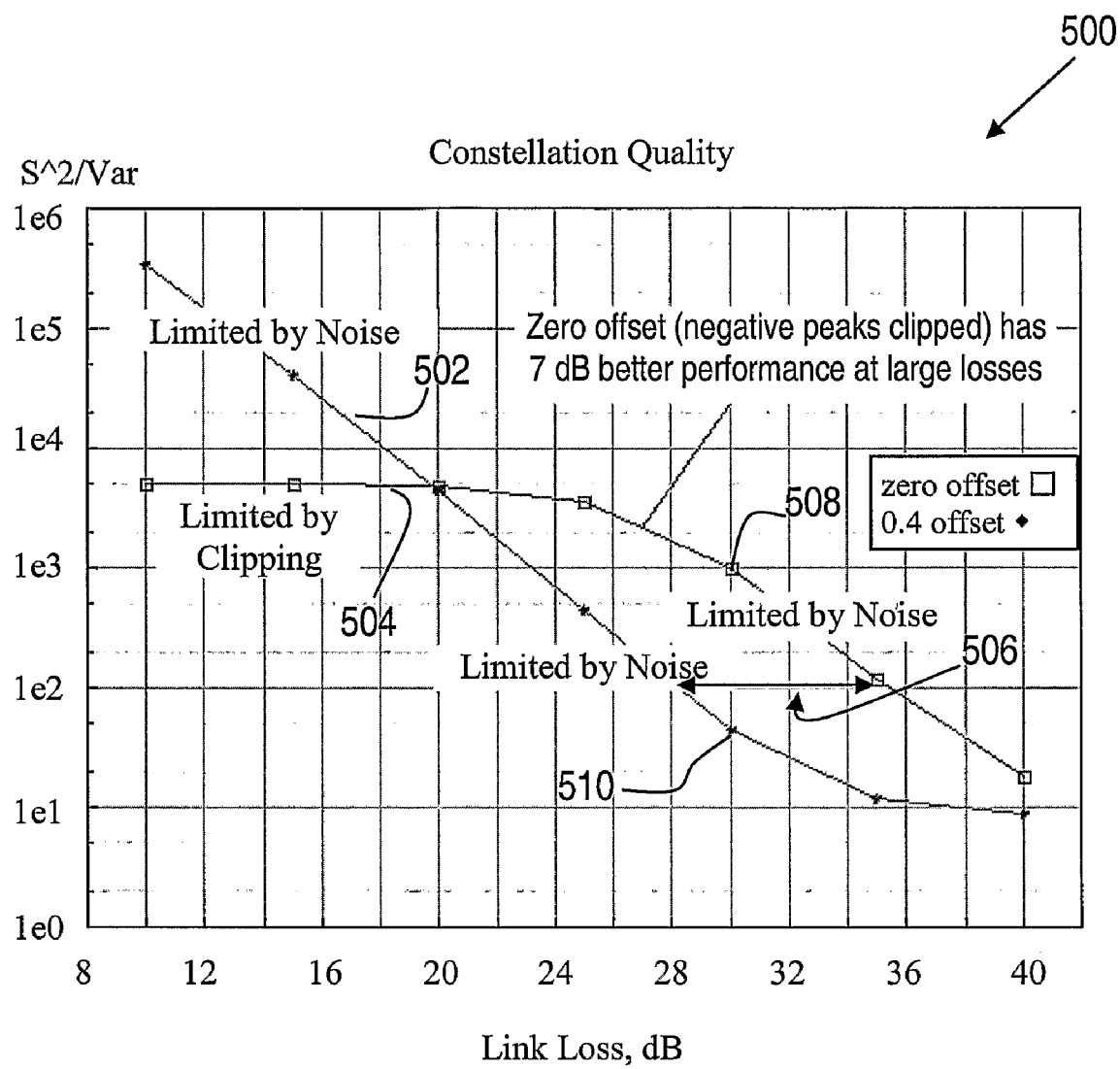
FIG. 5 is a graph illustrating received signal quality as a function of link loss according to an embodiment of the invention.

FIG. 5 shows a corresponding graph 500 illustrating the received signal quality as a function of the overall loss of the optical channel 106. Two traces are shown in the graph 500, the first trace 502 corresponding with a conventional system in which an optical bias level within the range 402 is applied, while the second trace 504 corresponds with a system in accordance with the present invention wherein a zero bias level 404 is applied in the optical transmitter 122. It is apparent from the graph 500 that for low values of link loss the effect of amplitude limiting on the transmitted signal is a form of distortion which results in a lower received signal quality for the inventive system than for an equivalent conventional system. However, at higher values of link loss, for example greater than 20 dB in the exemplary graph 500, and including 30 dB loss at points 508, 510 corresponding with constellation patterns 406, 408 shown in FIGS. 4B and 4C, the benefits of making more efficient use of the available optical transmitter power are realised. Accordingly, at high levels of link loss a 7 dB improvement 506 in power budget is achievable using the inventive system. Accordingly, embodiments of the present invention enable optical transmission systems to be implemented which provide greater transmission range and/or greater reliability and tolerance to variations in the link loss, such as may be experienced in free space systems.

Figure 6:
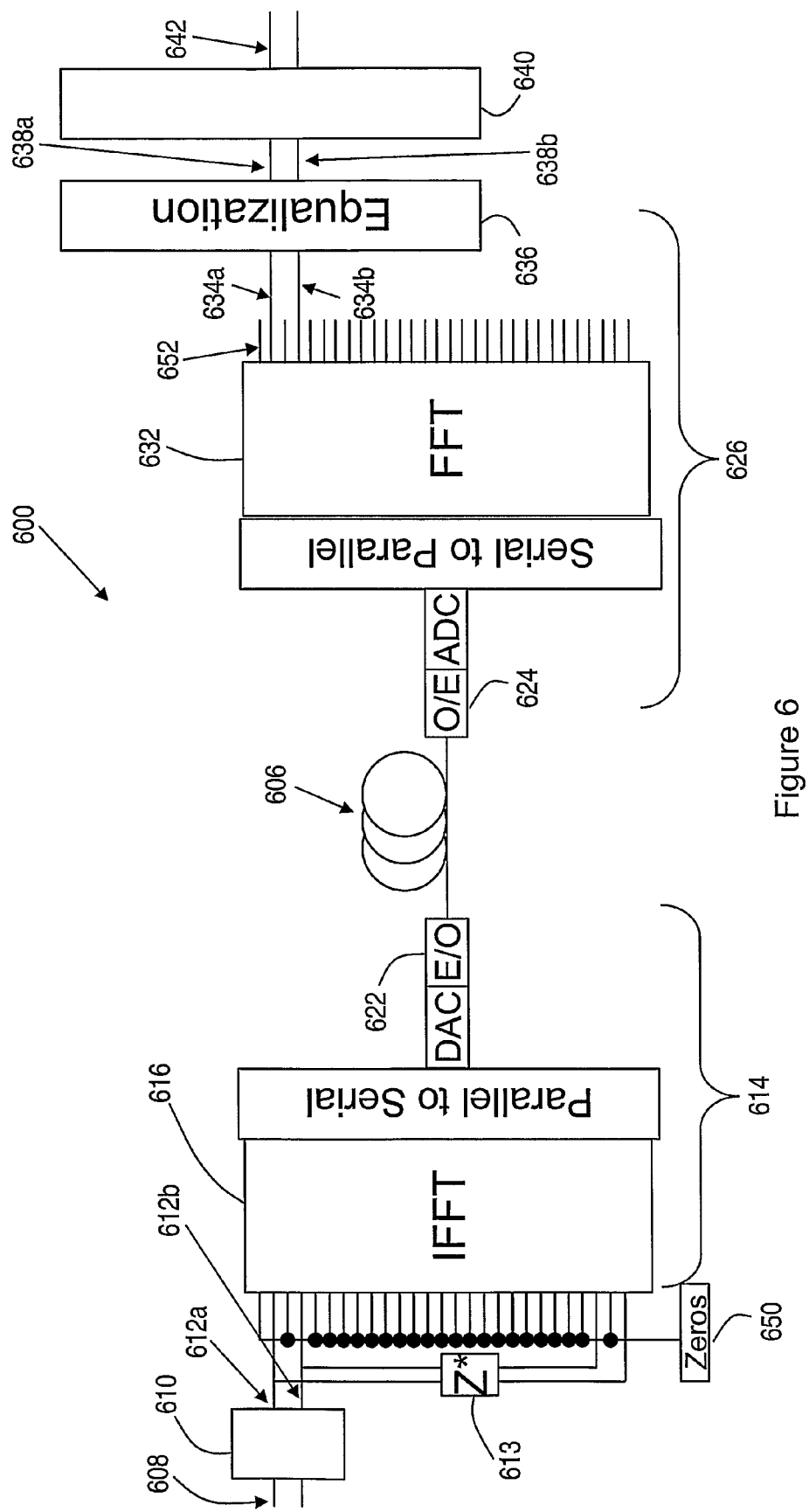
FIG. 6 illustrates schematically an alternative system for communicating digital information over an optical channel using only odd numbered OFDM channels according to an embodiment of the invention.

As has previously been indicated, many variations are possible within the scope of the invention, and accordingly one possible alternative arrangement 600 is illustrated in FIG. 6. The alternative transmission system 600 employs OFDM techniques, in a similar manner to the exemplary system 100, however only the odd-numbered OFDM channels are used to transmit information. In this regard, it should be noted that the convention employed in relation to the specific embodiments described and depicted herein assigns the channel number zero to the lowest-frequency OFDM channel, whereby the odd-numbered channels include the corresponding adjacent higher-frequency channel (i.e. channel 1), and each alternate higher-frequency channel thereafter (i.e. channels 3, 5, 7 and so forth). For the avoidance of doubt in relation to the general case, this convention may be expressed in more precise mathematical terms as follows. An N point inverse DFT transforms N (generally complex) frequency domain samples X(0) . . . X(N−1) into N (generally complex) time domain samples x(0) . . . x(N−1), where the value of the k-th time domain sample is given by $$x(k) = \frac{1}{N}\sum_{m=0}^{N-1} X(m)\exp\left(\frac{j\pi km}{N}\right)$$

According to this formulation, the odd-numbered channels are those inverse DFT inputs X(m) for which m is an odd number.

To simplify the present discussion, only two parallel information inputs 608 are illustrated in FIG. 6, corresponding with odd-numbered channels 1 and 3 respectively, however it will be appreciated that a larger number of information bits may be included in each data block as has previously been described with reference to FIG. 1.

In the embodiment 600 the input information bits are encoded according to a QAM scheme by mapping units 610, to produce corresponding symbol values 612a, 612b. Complex conjugate values of these symbols are generated by conjugator 613, which ensures that the IFFT 616 is provided with suitable inputs for generating a real-valued time-varying output signal. The symbol values 612a, 612b, and their corresponding complex conjugates, are provided to odd-numbered inputs of IFFT 616, while the even-numbered inputs, and other unused inputs in the example, are provided with zero values 650. The input symbols are processed by the components 614 in the same manner as previously described in relation to components 114 in FIG. 1. The resulting time-varying signal is applied to optical transmitter 622, and a corresponding asymmetrically-limited signal is transmitted over optical channel 606 to the optical detector 624.

The received signal is processed by the frequency domain equaliser components 626, in the same manner as previously described with reference to FIG. 1. The values 634a, 634b corresponding with the transmitted symbol value 612a, 612b are input to equaliser bank 636 to produce the equalised symbol values 638a, 638b. The equalised values are then decoded by demodulator bank 640 in order to recover the transmitted information bits 642.

In the embodiment 600, the output values, e.g. 652, from the FFT 632 which correspond with the zero input values to IFFT 616 are discarded. However, in alternative embodiments it may be possible to use the received symbol values corresponding with the zero input values, for example as a feedback mechanism to monitor and/or optimise distortion levels, or to improve the reliability of demodulation and decoding of the received signal.

The alternative embodiment 600 has reduced bandwidth efficiency compared with the embodiment 100, since only every second sub-carrier of the multi-carrier OFDM signal is utilised. However, it can be shown that the distortion products generated as a result of amplitude limiting of the transmitted optical signal produce interfering components only at frequencies corresponding with the even-numbered sub-carriers. Accordingly, the alternative embodiment 600 is able to provide received signals having higher quality than those produced by the embodiment 100.

It can also be shown that a similar reduction in the effects of distortion products due to asymmetric amplitude limiting may be achieved by utilising OFDM transmission in which a low-frequency portion of the available bandwidth is not used. For example, by modulating the electrical OFDM signal onto an RF carrier having an appropriately selected frequency, a low-frequency "guard band" corresponding with the RF bandwidth of the OFDM signal may be provided such that, for example, first-order difference-frequency distortion products are substantially generated outside the received signal bandwidth. Depending upon the tolerable levels of distortion, a narrower guard band may be acceptable, for example having 50% of the RF bandwidth of the OFDM signal, while still substantially reducing the impact of distortion products upon transmitted symbols. Such arrangements again provide alternative embodiments in which the quality of the received signal may be improved at the expense of reduced bandwidth efficiency. A further advantage of using a low frequency guard band, particularly when free-space optical transmission is employed, is that interference from low frequency optical sources, such as ambient lighting, including incandescent and fluorescent lamps, may be substantially rejected in the receiver.

Figure 7:
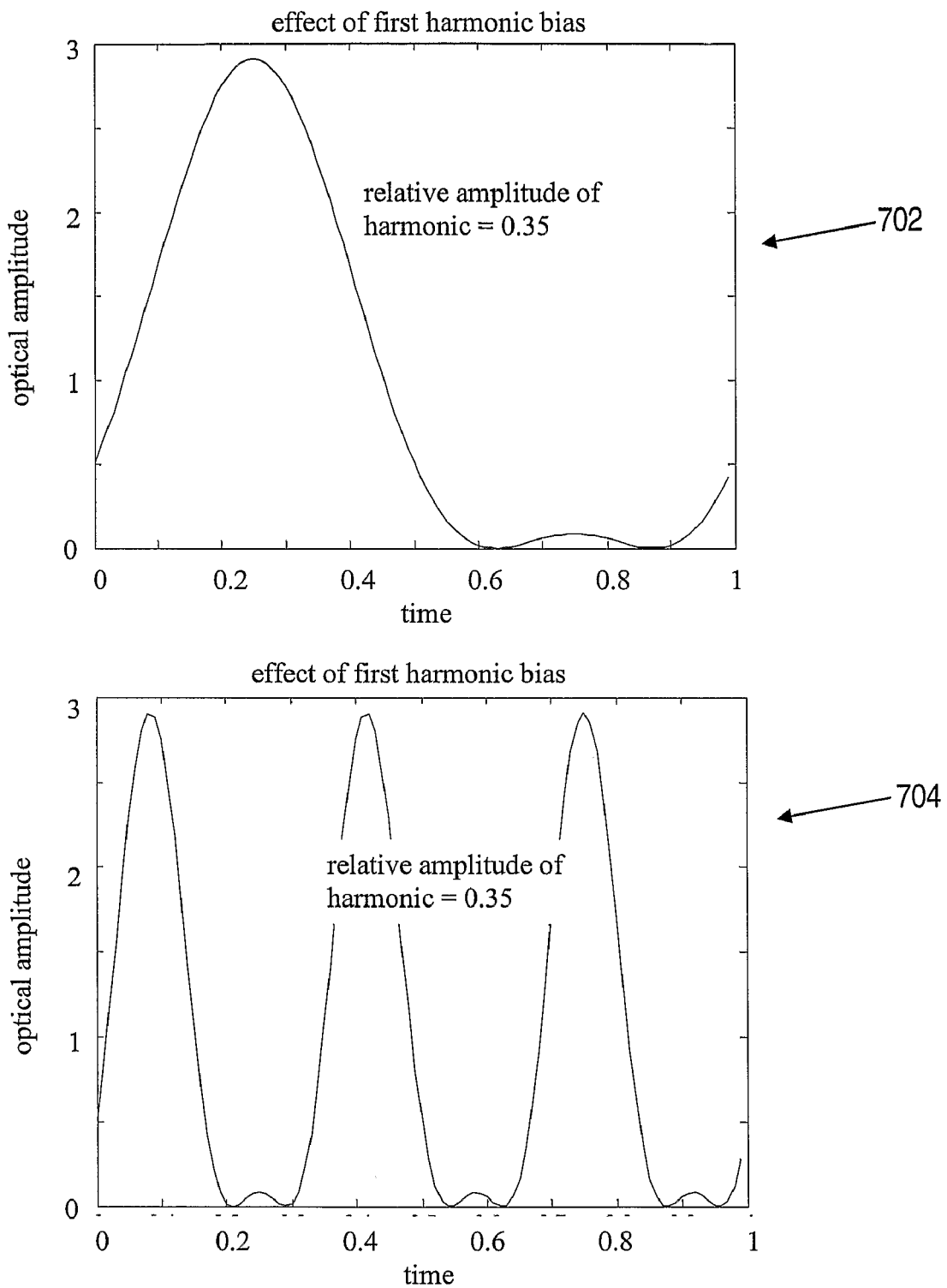
FIG. 7 illustrates waveforms generated by mapping transmitted signals onto pairs of sub-carriers according to an alternative embodiment of the invention.

FIG. 7 shows two waveforms, 702, 704 illustrating yet another possible technique for generating an asymmetric time-varying electrical signal for use in embodiments of the present invention. The waveforms 702, 704 are generated by combining pairs of frequency sub-carriers in order to produce corresponding asymmetric waveforms which may then be applied, with an appropriate bias level, to an optical transmitter. By constructing asymmetric waveforms, such as those illustrated in FIG. 7, it may be possible to provide an embodiment of the invention in which a low bias level may be applied in an optical transmitter, in order to generate an optical signal including an asymmetrically amplitude-limited transmitted signal, without producing corresponding clipping and associated distortion of the signal. Again, since it is necessary to use multiple sub-carriers in order to generate the waveforms, e.g. 702, 704 an improvement in received signal quality is achieved at the expense of bandwidth efficiency.

It may also be possible, in some embodiments of the invention, to utilise alternative modulation techniques, such as pulse-position modulation (PPM), in place of OFDM.

It will also be appreciated by those skilled in the art that the embodiments 100 and 600 exemplify two general methods known in the art for mapping complex-valued symbols onto the continuous real-valued channel provided by an intensity-modulated optical source. One such method involves the modulation of the real and imaginary components of the complex values in quadrature onto RF subcarriers in the electrical domain and then modulating the optical source with the resulting real valued signal. The second method involves providing the IDFT, e.g. 616, of the transmitter with a suitable conjugate-symmetric input, or alternatively implementing an equivalent real-valued transform, in order to generate a real-valued baseband signal which may be used to modulate the optical source. It will be understood that these methods, and their equivalents, both fall within the scope of the invention.

Additionally, while embodiments of the invention have been described in which a single optical transmitter and a single optical receiver are provided, it will be appreciated that the invention is suited to application in systems employing multiple transmitters and/or receivers, such as MIMO (multiple-input-multiple-output) optical wireless systems. Indeed, the present invention may provide particular advantages in such systems, since conventional intensity-modulated optical systems are not able to obtain benefits from the use of multiple sources and/or receivers that are known to be achievable in RF wireless systems.

For example, in one possible arrangement multiple sources (e.g. multiple lasers or LEDs) may be used to transmit a common signal. The resulting multiple optical signals may then be received at one or more optical detectors, equalised and recombined to provide improved reliability in an environment in which the strength of the signal received from any individual source may be variable or otherwise impaired such as by shadowing. Similarly, the use of multiple detectors, with one or more sources, enables improved reliability to be achieved when the strength of the signal received at any one detector may be variable or otherwise impaired.

In still another MIMO arrangement, multiple optical sources may be used to transmit different information streams to a receiver which includes multiple optical detectors. A variety of approaches have been developed for performing spatial multiplexing in such a system, including BLAST coding, Alamouti coding and the like. Such schemes are generally most effective in a rich scattering environment, and a wireless optical system may be particularly advantageous in this regard since, unlike typical radio systems, free-space optical paths may include numerous reflections in a typical in-building application.

Further arrangements including multiple transmitters and receivers include those in which multiple devices communicate over a shared optical medium, such as a free-space environment, using any one of a number of suitable multiple access methods known in the art. For example, distinct pairs of communicating devices may communicate with one another over a common optical medium using methods and apparatus in accordance with the invention, in combination with multiple access methods such as frequency division multiple access (FDMA), time division multiple access (TDMA), orthogonal frequency division multiple access (OFDMA), code division multiple access (CDMA), multi-carrier CDMA (MC-CDMA), and so forth.

Other advantageous variations within the scope of the invention include those which enable further improvements in transmission distance, reliability, efficiency and/or capacity to be achieved. For example, some embodiments of the invention may be configured to avoid transmission at frequencies subject to, or resulting in, increased interference, noise or other forms of degradation. Techniques for achieving improved utilisation of channels exhibiting frequency-dependent interference, noise, attenuation or fading, are known in the art, particularly for use with OFDM. For example, sub-carriers subject to higher levels of interference, or reduced signal-to-noise ratio, may be avoided altogether, or used to transmit symbols having a reduced information content (i.e. a smaller number of information bits).

Yet another technique that may enable improvements in transmission performance to be realised, within the scope of the invention, is to transmit data blocks in high-power, high-data-rate bursts, rather than as continuous transmissions at lower power and data rate. This technique may result in an overall improvement in signal-to-noise ratio at the optical detector which may be used to achieve an overall increase in capacity and/or transmission distance.

It will therefore be readily apparent to those skilled in the art that many variations of the present invention are possible, and that the invention is not to be limited to the particular embodiments described herein. Rather, the scope of the invention is defined by the claims appended hereto.

The invention claimed is:

1. A method of transmitting digital information over an optical channel, comprising the steps of:
 processing input digital information bits to generate a corresponding electrical orthogonal frequency division multiplexed (OFDM) signal waveform;
 applying a modulation to intensity of an optical carrier corresponding with the electrical OFDM signal waveform to produce an optical signal, the modulation having an amplitude and a bias level selected such that negative excursions of a waveform of the optical signal are clipped at a minimum output optical power level whereby said optical signal waveform is asymmetrically-limited in amplitude; and
 transmitting the optical signal over the optical channel to a receiver which comprises an optical intensity detector,
 wherein the modulation amplitude and bias level are selected such that an increase in the bias level and/or a decrease in the amplitude to reduce clipping at the minimum output optical power level results in a corresponding reduction of quality of an OFDM signal of equivalent optical power detected at the receiver by the optical intensity detector.

2. The method of claim 1 wherein positive excursions of the waveform of the optical signal are not clipped, or are clipped to a lesser degree at a relatively higher maximum output power level of the optical signal.

3. The method of claim 1 wherein the bias level is selected such that any substantial increase or decrease in the bias level results in a corresponding reduction of quality of the OFDM signal of equivalent optical power detected at the receiver by the optical intensity detector.

4. The method of claim 1 wherein the bias level corresponds with the minimum output optical power level.

5. The method of claim 1 wherein a net loss of the optical channel exceeds a predetermined minimum value above which the selected modulation amplitude and bias level provide an increase in quality of the OFDM signal detected at the receiver relative to a corresponding signal that is not clipped, or is clipped to a lesser degree, at the minimum output optical power level.

6. A method of receiving digital information transmitted over an optical channel via an optical signal to which an intensity modulation is applied corresponding with an electrical OFDM signal waveform carrying the digital information, the modulation having an amplitude and a bias level selected such that negative excursions of a waveform of the optical signal are clipped at a minimum output optical power level whereby said optical signal waveform is asymmetrically-limited in amplitude, the method comprising the steps of:
  detecting the optical signal using an optical intensity detector, to produce a received electrical signal corresponding with the asymmetrically-limited optical signal waveform;
  applying a transformation of the received electrical signal from the time domain to the frequency domain to generate a corresponding plurality of received OFDM symbol values;
  performing an equalisation of the received OFDM symbol values to produce estimates of corresponding transmitted OFDM symbol values; and
  recovering the digital information from the estimates of transmitted OFDM symbol values,
  wherein the modulation amplitude and bias level are selected such that an increase in the bias level and/or a decrease in the amplitude to reduce clipping at the minimum output optical power level results in a corresponding reduction of accuracy of the estimates of transmitted OFDM symbol values for a detected optical signal of equivalent optical power.

7. The method of claim 6 wherein the transmitted digital information comprises error detection codes, the method comprising a further step of assessing the accuracy of the estimates of transmitted OFDM symbol values by determining a rate of errors using said error detection codes.

8. The method of claim 7 wherein the error detection codes comprise error correction codes, the method comprising a further step of correcting detected errors using said error correction codes.

9. An apparatus for transmitting digital information over an optical channel, comprising:
  a signal generator adapted to process input digital information bits to generate a corresponding electrical orthogonal frequency division multiplexed (OFDM) signal waveform;
  an optical transmitter having an input adapted to receive the OFDM signal waveform, and configured to apply a modulation to intensity of an optical carrier corresponding with the electrical OFDM signal waveform to produce an optical signal, the modulation having an amplitude and a bias level selected such that negative excursions of a waveform of the optical signal are clipped at a minimum output optical power level whereby said optical signal waveform is asymmetrically-limited in amplitude; and
  an optical output port for transmitting the optical signal over the optical channel to a receiver which comprises an optical intensity detector,
  wherein the modulation amplitude and bias level are selected such that an increase in the bias level and/or a decrease in the amplitude to reduce clipping at the minimum output optical power level results in a corresponding reduction of quality of an OFDM signal of equivalent optical power detected at the receiver by the optical intensity detector.

10. The apparatus of claim 9 wherein the optical transmitter comprises a directly-modulated light-emitting diode (LED) or laser diode (LD), the transmitter input being adapted to apply the OFDM signal waveform as a corresponding drive current to the LED or LD, wherein the bias level is applied as a constant current offset.

11. The apparatus of claim 9 wherein the optical transmitter comprises a continuous wave (CW) optical source coupled to an optical modulator having an electrical modulation input, the transmitter input being adapted being adapted to apply the OFDM signal waveform as a corresponding electrical drive signal to the optical modulator, wherein the bias level is applied as a constant electrical signal level offset.

12. An apparatus for receiving digital information transmitted over an optical channel via an optical signal to which an intensity modulation is applied corresponding with an electrical OFDM signal waveform carrying the digital information, the modulation having an amplitude and a bias level selected such that negative excursions of a waveform of the optical signal are clipped at a minimum output optical power level whereby said optical signal waveform is asymmetrically-limited in amplitude, the apparatus comprising:
  an optical intensity detector, configured to detect the optical signal to produce a received electrical signal corresponding with the asymmetrically-limited optical signal waveform;
  a signal processor operatively coupled to the intensity detector and adapted to:
  apply a transformation to the received electrical signal from the time domain to the frequency domain to generate a corresponding plurality of received OFDM symbol values;
  perform an equalisation of the received OFDM symbol values to produce estimates of corresponding transmitted OFDM symbol values; and
  recover the digital information from the estimates of transmitted OFDM symbol values,
  wherein the modulation amplitude and bias level are selected such that an increase in the bias level and/or a decrease in the amplitude to reduce clipping at the minimum output optical power level results in a corresponding reduction of accuracy of the estimates of transmitted OFDM symbol values for a detected optical signal of equivalent optical power.

13. The apparatus of claim 12 wherein the transmitted digital information comprises error detection codes, and the signal processor is further adapted to assess the accuracy of the estimates of transmitted OFDM symbol values by determining a rate of errors using said error detection codes.

14. The apparatus of claim 12 wherein the error detection codes comprise error correction codes, and the signal processor is further adapted to correct detected errors using said error correction codes.

* * * * *